(12) United States Patent
Elias et al.

(10) Patent No.: US 9,396,862 B2
(45) Date of Patent: Jul. 19, 2016

(54) SECONDARY TRANSFORMER UNIT FOR MOUNTING ON A VEHICLE HAVING AN ELECTRIC DRIVE, AND VEHICLE HAVING AN ELECTRIC DRIVE

(71) Applicant: Audi AG, Ingolstadt (DE)

(72) Inventors: Björn Elias, Hepberg (DE); Christian Ohlen, Gaimersheim (DE); Anca Ebner, Vohburg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/352,630

(22) PCT Filed: Oct. 5, 2012

(86) PCT No.: PCT/EP2012/004174
§ 371 (c)(1),
(2) Date: Apr. 17, 2014

(87) PCT Pub. No.: WO2013/056791
PCT Pub. Date: Apr. 25, 2013

(65) Prior Publication Data
US 2014/0253278 A1  Sep. 11, 2014

(30) Foreign Application Priority Data
Oct. 18, 2011  (DE) .......... 10 2011 116 250

(51) Int. Cl.
*H01F 17/04* (2006.01)
*H01F 27/42* (2006.01)
(Continued)

(52) U.S. Cl.
CPC .......... *H01F 27/022* (2013.01); *B60L 11/182* (2013.01); *H01F 38/14* (2013.01);
(Continued)

(58) Field of Classification Search
CPC ....... H01F 27/022; H01F 27/02; H01F 28/14; B06L 11/182; Y02T 10/7005; Y02T 90/122; Y02T 90/14
USPC .................. 336/212, 219, 220, 221; 307/104; 320/108, 2
See application file for complete search history.

(56) References Cited

U.S. PATENT DOCUMENTS 5,341,083 A * 8/1994 Klontz et al. ................. 320/109
5,656,983 A   8/1997 Ito et al.
(Continued)

FOREIGN PATENT DOCUMENTS

CN  1125921 A   7/1996
DE  24 34 890    11/1975
(Continued)

OTHER PUBLICATIONS

International Search Report issued by the European Patent Office in International Application PCT/EP2012/004174 on Mar. 22, 2013.
(Continued)

*Primary Examiner* — Mangtin Lian
(74) *Attorney, Agent, or Firm* — Henry M. Feiereisen LLC.

(57) ABSTRACT

A secondary transformer unit for mounting on a vehicle having an electric drive includes at least one secondary core, and at least one secondary coil that is arranged on the secondary core. At least one outer skin is provided to envelope the secondary core and contains reinforcing fibers. The outer skin is configured to retain inside the at least one outer skin fragments produced when the at least one secondary core breaks.

7 Claims, 2 Drawing Sheets

(51) Int. Cl.
*H02J 7/00* (2006.01)
*H01F 27/02* (2006.01)
*B60L 11/18* (2006.01)
*H01F 38/14* (2006.01)
*H02J 7/02* (2016.01)

(52) U.S. Cl.
CPC .............. *H02J 7/025* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| 7,498,917 | B1* | 3/2009 | Yang ............................... 336/90 |
| 2009/0189458 | A1 | 7/2009 | Kawasaki |
| 2010/0097168 | A1 | 4/2010 | Hahn et al. |
| 2010/0201309 | A1 | 8/2010 | Meek |
| 2010/0277121 | A1 | 11/2010 | Hall et al. |
| 2011/0254503 | A1* | 10/2011 | Widmer ................ B60L 11/182 320/108 |

FOREIGN PATENT DOCUMENTS

| DE | 37 18 676 | 12/1988 |
| DE | 102006048831 | 4/2008 |
| DE | 102009023409 | 12/2010 |
| DE | 102010022740 A1 | 9/2011 |

OTHER PUBLICATIONS

Chinese Search Report issued by the Chinese Patent Office in Chinese Patent Application No. 2012800515685 o Jul. 16, 2015.
Translation of Chinese Search Report issued by the Chinese Patent Office in Chinese Patent Application No. 2012800515685 o Jul. 16, 2015.

* cited by examiner

SECONDARY TRANSFORMER UNIT FOR MOUNTING ON A VEHICLE HAVING AN ELECTRIC DRIVE, AND VEHICLE HAVING AN ELECTRIC DRIVE

CROSS-REFERENCES TO RELATED APPLICATIONS

This application is the U.S. National Stage of International Application No. PCT/EP2012/004174, filed Oct. 5, 2012, which designated the United States and has been published as International Publication No. WO 2013/056791 and which claims the priority of German Patent Application, Serial No. 10 2011 116 250.3, filed Oct. 18, 2011, pursuant to 35 U.S.C. 119(a)-(d).

BACKGROUND OF THE INVENTION

The invention relates to a secondary transformer unit for attachment to a vehicle with an electric drive having at least one secondary core and at least one secondary coil arranged on the secondary core, and to a vehicle with an electric drive.

Motor vehicles with an electric drive, such as hybrid cars and pure electric cars, which have traction batteries for supplying electric power to an electric motor, are known in the art. These conventional motor vehicles are equipped with a system for inductive energy transfer, which also allows a frequent recharging of the batteries with ease of use. This system works like a transformer and includes a primary transformer unit installed on the infrastructure side, for example on the rear wall of a garage, and a secondary transformer unit that is integrated at the front of the motor vehicle behind the front license plate.

The document DE 10 2009 023 409 A1 relates to a system for electric power transmission and forms the basis for the preamble of claim 1. This document discloses a secondary transformer unit or secondary transformer which is mounted at the bow or at the front of an electric vehicle and includes a U-shaped half transformer core and a coil winding wound thereon at an oblique angle. This secondary transformer unit is mounted at the front bumper of the electric vehicle, and the front license plate of the electric vehicle is mounted on the secondary transformer unit.

Since this conventional secondary transformer unit is mounted at the bow of the vehicle, it must be integrated in an area of the vehicle that has a high influence on the crash behavior in accidents involving pedestrians. In particular, the front of the vehicle becomes harder due to the additionally installed components, in particular the half-transformer core usually composed of magnetic steel sheets or ferrite; however, a well-defined and smooth vehicle front is necessary to minimize the risk of injury to pedestrians. Since the conventional secondary transformer unit is mounted at the front bumper behind the front license plate, less space remains available for deformation elements made of foam arranged between the bumper and the passenger compartment, requiring a reduction of their thickness, i.e. its extent in the direction of travel. This leads to a further increase of the hardness of the vehicle front.

DE 24 34 890 B1 describes an apparatus for connecting a charger arranged in a motor vehicle with an AC power grid or three-phase power grid. The apparatus is composed of a transformer divided into two parts, wherein the two parts each have a core on which the respective primary and secondary windings are arranged. The transformer part connected to an AC power grid and having the primary windings is arranged in a charging board of a parking space, whereas the transformer part connected to the secondary windings is located in a bumper of the motor vehicle. The transformer parts are provided with a plastic cover for corrosion protection.

DE 37 18 676 A1 discloses a molded article made of composite material, in particular of a hybrid material of fiber reinforced plastic and metal with a film-like or layer-like or spongy or network-like core which is embedded in plastic. The reinforcing fibers may be made of aramide, carbon and/or glass.

SUMMARY OF THE INVENTION

It is the object of the invention to improve a secondary transformer unit and a vehicle with an electric drive with such a secondary transformer unit with respect to crash behavior in accidents involving pedestrians.

The invention is based on the realization that the half-transformer core, which typically consists of laminated magnetic steel sheets or ferrite, may break or tear in an accident, producing sharp-edged, hard fragments that increase the risk of injury especially for an involved pedestrian.

According to a first aspect, the invention relates to a secondary transformer unit for attachment to a vehicle having an electric drive, including
- at least one secondary core;
- at least one secondary coil arranged on the secondary core, and
- at least one outer skin which at least partially surrounds at least the secondary core and contains the reinforcing fibers and which is configured to retain fragments within the outer skin when the secondary core breaks.

Since the outer skin at least partially envelops the secondary core, it can catch and retain sharp-edged, hard fragments of, for example, the secondary core containing magnetic steel sheet and/or electrical steel and/or ferrite which breaks apart or is torn in an accident, thereby reducing the risk of injury in particular for an involved pedestrian.

The outer skin may be formed in any way depending on the requirements, for example, it may only partially surround the secondary core or may not cover a portion of the secondary core or may envelop the entire secondary core or may completely envelop the secondary core.

When the outer skin only partially envelops the secondary core, it may be formed, for example, as a band or as a sleeve that is open on two opposite sides, or as a bag that is open on one side. Preferably, the band or the sleeve may cover a front side and a rear side of the secondary core that delimit the secondary core in an x-direction, as well as a top side and a bottom side of the secondary core that delimit the secondary core in a z-direction, while leaving a left side and a right side of the secondary core that delimit the secondary core in a y-direction uncovered. In this case, the x-direction corresponds to the direction of travel or longitudinal direction of the vehicle on which the secondary transformer unit is to be mounted, the y-direction corresponds to the transverse direction of this vehicle, and the z-direction corresponds to the vertical direction of this vehicle. The bag may preferably cover the front, back, top, bottom and the left or right side of the secondary core, while leaving the respective other side, i.e. the right or left side of the secondary core uncovered.

When the outer skin completely envelops the secondary core, it may be, for example, formed as an envelope that is open on neither side, or is closed on all sides. The envelope may preferably cover the front side, rear side, top side, bottom side, the left side and the right side of the secondary core or may leave no side of the secondary core uncovered.

It may be provided that the outer skin is at least partially attached to the secondary core.

In this way, catching, retaining and holding together fragments of the secondary core is further improved.

The attachment may be carried out, as required, in any desired manner, for example by gluing and/or welding.

The outer skin may be formed, as required, in any desired manner, for example so as to at least partially enveloping only the secondary core or in addition also the secondary coil.

When the outer skin envelops the secondary core and the secondary coil, it may advantageously press the secondary coil against the secondary core.

The secondary core may be constructed, as required, in any manner and is preferably substantially plate-shaped and has, for example, a thickness in the x-direction, a width in the y-direction and a height in the z direction, wherein the thickness is less than the height and the height is less than the width.

Such a substantially plate-shaped secondary core can be easily deformed, in particular bent or broken through, in the x-direction in the event of a collision, and requires little installation space between the bumper and the passenger compartment, so that foam deformation elements to be mounted in this area which is important for the frontal crash performance can have a greater thickness, i.e. dimension in the direction of travel.

It may be provided that the outer skin is tear-resistant and/or cut-resistant.

Such outer skin is able to also catch and retain sharp fragments of the secondary core in its interior.

The outer skin may be formed, as necessary, in any manner and may have, for example, a woven fabric and/or knit fabric and/or a network and/or a film.

The materials for the woven fabric, the knit fabric, the network and the film may be selected arbitrarily as required, and contain, for example, at least one metal and/or at least one rubber material and/or at least one plastic material and/or carbon and/or at least one silicone and/or at least one glass and/or at least one ceramic.

The reinforcing fibers may be formed, as needed, in any number of ways and preferably contain aramide fibers and/or glass fibers and/or carbon fibers and/or metal fibers.

According to a second aspect of the invention proposes, a vehicle with an electric drive is proposed, including at least one of the proposed secondary transformer units.

It may be provided that one of the secondary transformer units is arranged at the front of the vehicle and/or one of the secondary transformer units is arranged at the rear of the vehicle and/or one of the secondary transformer units is arranged at the left side of the vehicle and/or one of the secondary transformer units is arranged at the right side of the vehicle and/or one of the secondary transformer units is arranged at the bottom of the vehicle and/or one of the secondary transformer units is arranged on the roof of the vehicle.

Each proposed vehicle may further include a front license plate arranged in front of a secondary transformer unit at the front in the direction of travel, and/or a rear license plate arranged in the direction of travel behind a secondary transformer unit mounted at the rear.

The discussions relating to one aspect of the invention, in particular to individual features of this aspect, apply mutatis mutandis similarly for the other aspects of the invention.

Embodiments of the invention will now be described in more detail with reference to the accompanying drawings. The resulting individual features, however, are not limited to the individual embodiments, but may be combined with several of the above-described individual features and/or with features of other embodiments. The details in the drawings are to be understood as only illustrative, but not as limiting. The reference symbols included in the claims are not intended to limit the scope of the invention in any way, but merely refer to the embodiments shown in the drawings.

DETAILED DESCRIPTION OF PREFERRED EMBODIMENTS

Figure 1:
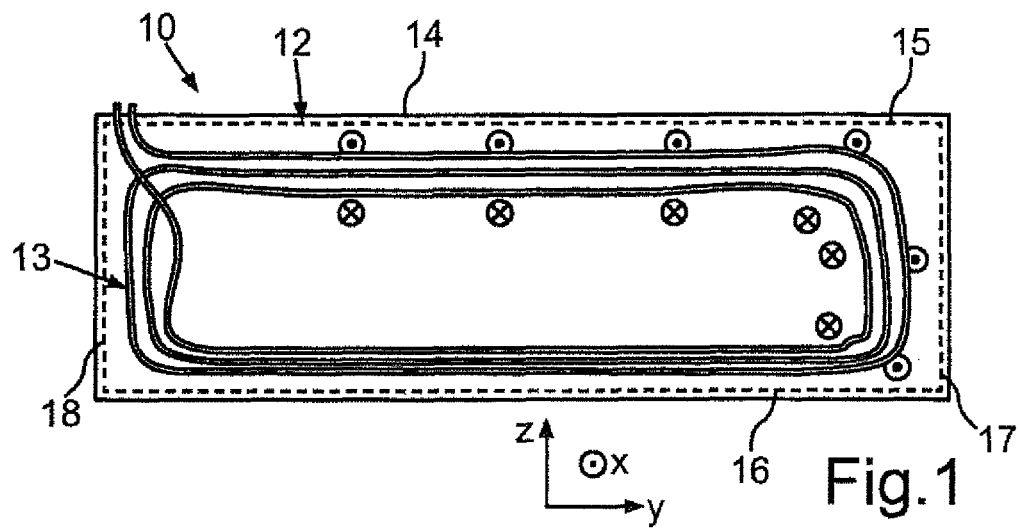
FIG. 1 a front view of a secondary transformer unit in a first embodiment, which can be arranged at a front of a vehicle having an electric drive.
Figure 2:
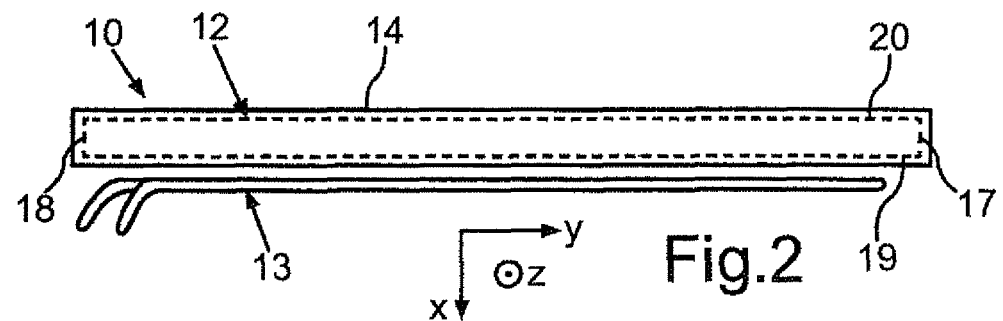
FIG. 2 the plan view of FIG. 1.
Figure 4:
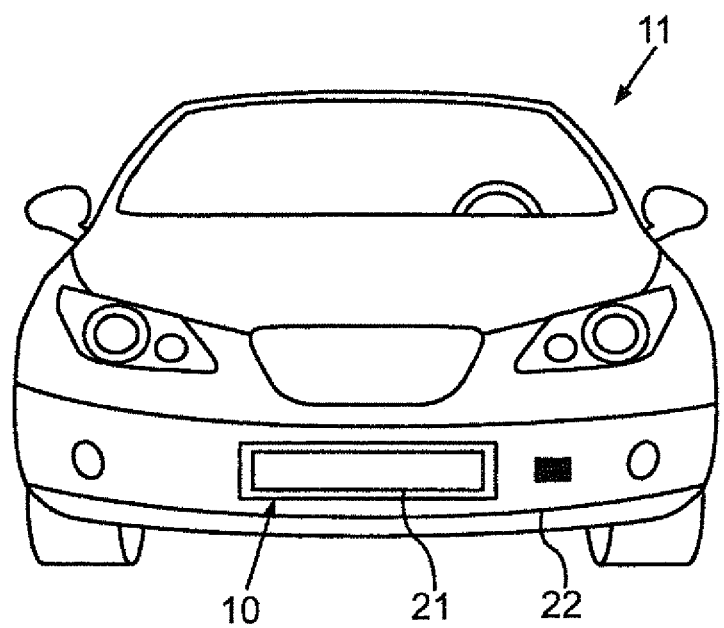
FIG. 4 a front view of a vehicle with an electric drive in a preferred embodiment.

FIGS. 1 and 2 show schematically a first embodiment of a secondary transformer unit 10 according to the invention for installation on a vehicle 11 with an electric drive (FIG. 4). This secondary transformer unit 10 includes a secondary core 12, a secondary coil 13 arranged on the secondary core 12, and an outer skin 14 enveloping the secondary core 12.

In this first embodiment, the secondary core 12 is plate-shaped, is made of ferrite, and has a top side 15, a bottom side 16, a left side 17, a right side 18, a front side 19 and a rear side 20. The top side 15 and bottom side 16 delimit the secondary core 12 in a z-direction, which points in FIG. 1 toward the top side and in FIG. 2 toward the front side of the drawing plane. The left side 17 and the right side 18 delimit the secondary core 12 in a y-direction, which points in FIGS. 1 and 2 to the right. The front side 19 and the rear side 20 delimit the secondary core 12 in an x-direction, which points in FIG. 1 toward the front out of the drawing plane and in FIG. 2 downwards. The x-direction corresponds to the direction of travel or the longitudinal direction of the vehicle 11, the y-direction corresponds to the transverse direction of the vehicle 11, and the z-direction corresponds to the vertical direction of the vehicle 11. In addition, the secondary core 12 has a width in the y direction that corresponds to the distance between the left side 17 and the right side 18, a height in the z direction that corresponds to the distance between the top side 15 and bottom side 16 and significantly smaller than the width, and in the x direction a thickness that corresponds to the distance between the front side 19 and the rear side 20 and is significantly smaller than the height.

In this first embodiment, the outer skin 14 has a tear-proof fabric of aramide fibers and envelops only the secondary core 12, but not the secondary coil 13. The outer skin 14 is closed on all sides, much like an envelope or a bubble, covers the top side 15, the bottom side 16, the left side 17, the right side 18, the front side 19 and the rear side 20 and is glued to the front side 19 and the rear side 20 with an unillustrated adhesive.

In this first embodiment, the secondary coil 13 is arranged in three substantially rectangular turns on the front side 19 of the secondary core 12. An unillustrated primary transformer unit which includes a primary core and a primary coil arranged on the primary core is configured to generate a magnetic field when being placed at a small distance in front of the front side 19 and when an alternating current flows through its primary coil, with the field lines indicated in FIG. 1 by the circles with a dot and the circles with a cross. Field lines enter, for example, the front face 19 of the secondary core 12 at locations marked by the circles with a cross and exit the secondary core 12 at locations marked by the circles with a dot and extend inside the secondary core 12 from the circles with a cross to the circles with a dot. These field lines thus envelop the turns of the secondary coil 13 and induce therein an AC voltage which is supplied to an unillustrated high-voltage onboard electrical system of the vehicle 11 for charging its traction batteries.

In this first embodiment, the turns of the secondary coil 13 are glued to the front side of the outer skin 14 which faces forward in the x-direction.

Figure 3:
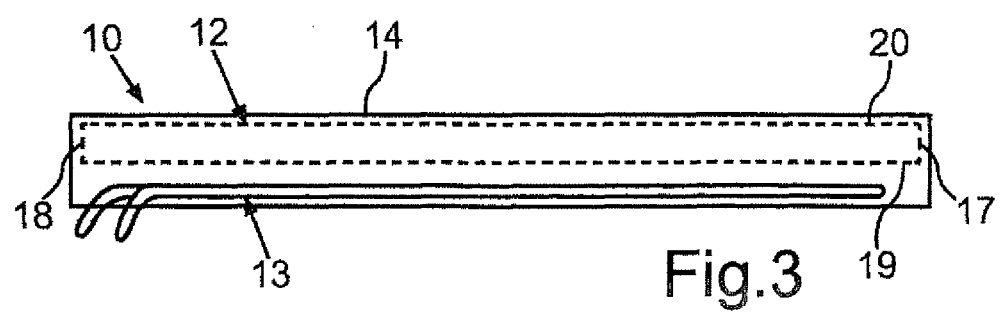
FIG. 3 a front view of a secondary transformer unit in a second embodiment.

FIG. 3 illustrates a secondary transformer unit 10 according to the invention in a second embodiment. This second embodiment is similar to the first embodiment, so in the following only the differences will be described in detail.

In this second embodiment, the outer skin 14 envelops not only the secondary core 12, but also the secondary coil 13, and is glued only to the rear side 20 with an unillustrated adhesive.

In this second embodiment, the turns of the secondary coil 3 are glued to the front side 19 of the secondary core 12.

FIG. 4 shows schematically a preferred embodiment of a vehicle 11 according to the invention with an electric drive in the form of a hybrid car. This vehicle 11 includes a secondary transformer unit 10 in the first embodiment, a front license plate 21 and a front bumper 22.

In this preferred embodiment, the secondary transformer unit 10 is arranged at the front of the vehicle 11 and attached with the rear side of the outer skin 14 facing rearward in the x-direction to a front side to the front side of bumper 22 facing forward in to the x direction. Also, the license plate 21 is arranged in the x-direction in front of the secondary transformer unit 10 and fastened with its rear side facing rearward opposite to the x-direction to the front of the outer skin 14. In this case, the license plate 21 is arranged and the turns of the secondary coil 13 are placed on the front side of the outer skin 14 such that the license plate 21 abuts the partial area of the front side enveloped by the secondary coil 13 and the secondary coil 13 surrounds the license plate 21 without touching it.

The invention claimed is:

1. A secondary transformer unit for attachment to a vehicle having an electric drive, the secondary transformer unit comprising
    at least one secondary core with a front side and a rear side delimiting the secondary core in a longitudinal direction of the vehicle and a top side and a bottom side delimit the secondary core in a vertical direction of the vehicle;
    at least one secondary coil arranged on the secondary core, said at least one secondary coil supplying an induced AC voltage to high-voltage onboard electrical system of the vehicle; and
    at least one outer skin made of a tear-resistant fabric which is closed on all sides and envelops exclusively the at least one secondary core, without also enveloping the at least one secondary coil, so as to cover the front side, the rear side, the top side, the bottom side, as well as a left side and a right side of the at least one secondary core, and which is configured to retain inside the at least one outer skin fragments produced when the at least one secondary core breaks.

2. The secondary transformer unit of claim 1, wherein the at least one outer skin is at least partially attached to the at least one secondary core.

3. The secondary transformer unit of claim 1, wherein the tear-resistant fabric comprises at least one structure selected from a woven fabric, a knit fabric, a network and a film.

4. The secondary transformer unit of claim 3, wherein the at least one structure selected from a woven fabric, a knit fabric and a network comprises fibers selected from aramide fibers, glass fibers and carbon fibers.

5. A vehicle with an electric drive, the vehicle comprising at least one secondary transformer unit having
    at least one secondary core with a front side and a rear side delimiting the secondary core in a longitudinal direction of the vehicle and a top side and a bottom side delimiting the secondary core in a vertical direction of the vehicle;
    at least one secondary coil arranged on the secondary core, said at least one secondary coil supplying an induced AC voltage to high-voltage onboard electrical system of the vehicle; and
    at least one outer skin made of a tear-resistant fabric which is closed on all sides and envelops exclusively the at least one secondary core, without also enveloping the at least one secondary coil, so as to cover the front side, the rear side, the top side, the bottom side, as well as a left side and a right side of the at least one secondary core, and which is configured to retain inside the at least one outer skin fragments produced when the at least one secondary core breaks.

6. The vehicle of claim 5, wherein the at least one secondary transformer unit is arranged at at least one of the following locations:
    a front section of the vehicle, a rear section of the vehicle, a left side of the vehicle, a right side of the vehicle, a bottom side of the vehicle and a roof of the vehicle.

7. The vehicle of claim 6, further comprising a front license plate which is arranged in a direction of travel in front of the at least one secondary transformer unit when the at least one secondary transformer unit is arranged at the front section of the vehicle.

* * * * *